(12) United States Patent
Sylor et al.

(10) Patent No.: US 7,877,472 B2
(45) Date of Patent: Jan. 25, 2011

(54) SYSTEM AND METHOD FOR DISPLAYING HISTORICAL PERFORMANCE OF AN ELEMENT ON A NETWORK

(75) Inventors: Mark W. Sylor, Nashua, NH (US);
George Iglesias, Arlington, MA (US);
Jay B. Wolf, Framingham, MA (US);
Will C. Lauer, Marlborough, MA (US);
Lawrence A. Stabile, Cochituate, MA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 12/367,860

(22) Filed: Feb. 9, 2009

(65) Prior Publication Data

US 2009/0234944 A1    Sep. 17, 2009

(51) Int. Cl.
*G06F 15/173*    (2006.01)
(52) U.S. Cl. .................. 709/223; 709/224
(58) Field of Classification Search .......... 709/223, 709/224
See application file for complete search history.

(56) References Cited

U.S. PATENT DOCUMENTS

| | | | | |
|---|---|---|---|---|
| 5,634,009 A | * | 5/1997 | Iddon et al. | 709/223 |
| 5,706,436 A | * | 1/1998 | Lewis et al. | 709/235 |
| 5,724,362 A | | 3/1998 | Lau | 714/704 |
| 5,751,964 A | | 5/1998 | Ordanic et al. | 709/224 |
| 5,862,333 A | | 1/1999 | Graf | 709/223 |
| 6,021,437 A | | 2/2000 | Chen et al. | 709/224 |
| 6,061,725 A | * | 5/2000 | Schwaller et al. | 709/224 |
| 6,073,089 A | * | 6/2000 | Baker et al. | 702/185 |
| 6,081,840 A | | 6/2000 | Zhao | 709/224 |
| 6,098,195 A | | 8/2000 | Northcott | 714/812 |
| 6,115,393 A | * | 9/2000 | Engel et al. | 370/469 |
| 6,182,022 B1 | * | 1/2001 | Mayle et al. | 702/182 |
| 6,327,677 B1 | | 12/2001 | Garg et al. | 714/37 |
| 6,347,374 B1 | | 2/2002 | Drake et al. | 726/1 |
| 6,377,907 B1 | * | 4/2002 | Waclawski | 702/182 |
| 6,397,359 B1 | * | 5/2002 | Chandra et al. | 714/712 |
| 6,414,594 B1 | * | 7/2002 | Guerlain | 340/506 |
| 6,449,739 B1 | | 9/2002 | Landan | 714/47 |
| 6,453,346 B1 | | 9/2002 | Garg et al. | 709/224 |
| 6,480,809 B1 | | 11/2002 | Slaight | 702/186 |
| 6,556,957 B1 | * | 4/2003 | Daumer | 702/193 |

(Continued)

FOREIGN PATENT DOCUMENTS

WO    WO 00/10455    3/2000

OTHER PUBLICATIONS

Supplementary European Search Report of EP 01/948545; Oct. 18, 2004.

*Primary Examiner*—Kristie D Shingles
(74) *Attorney, Agent, or Firm*—Pillsbury Winthrop Shaw Pittman LLP

(57) ABSTRACT

A method of monitoring an element in a computer network including monitoring a preselected variable relating to that element; defining a threshold for the monitored preselected variable; establishing a sliding window in time; repeatedly generating a time above threshold value, the time above threshold value being a measure of an amount of time during which the monitored variable exceeded the threshold during the sliding window of time; detecting when the time above threshold value exceeds a condition window value; and in response to detecting when the time above threshold value exceeds the condition window, generating an alarm.

14 Claims, 8 Drawing Sheets

U.S. PATENT DOCUMENTS

| | | | |
|---|---|---|---|
| 6,564,174 B1 * | 5/2003 | Ding et al. | 702/186 |
| 6,564,342 B2 | 5/2003 | Landan | 714/48 |
| 6,594,241 B1 | 7/2003 | Malmlof | 370/329 |
| 6,664,978 B1 | 12/2003 | Kekic et al. | 715/733 |
| 6,691,256 B1 | 2/2004 | Cook et al. | 714/43 |
| 6,744,748 B1 | 6/2004 | Boulton et al. | 370/333 |
| 6,747,951 B1 | 6/2004 | Kalkunte et al. | 370/235 |
| 6,754,664 B1 | 6/2004 | Bush | 1/1 |
| 6,763,380 B1 * | 7/2004 | Mayton et al. | 709/224 |
| 6,785,540 B1 | 8/2004 | Wichelman | 455/423 |
| 6,836,800 B1 | 12/2004 | Sweet et al. | 709/224 |
| 6,862,623 B1 | 3/2005 | Odhner et al. | 709/226 |
| 6,882,963 B1 | 4/2005 | Slaight | 702/186 |
| 6,889,255 B1 | 5/2005 | DeLuca | 709/224 |
| 7,120,676 B2 | 10/2006 | Nelson et al. | 709/218 |
| 2002/0177910 A1 | 11/2002 | Quarterman et al. | 700/28 |

* cited by examiner

MTF 111
)

mib mib2
{
```
    ┌─────────────────────────┐
    │  file mib2.mib          │ ╱ 21
    │  version 2              │
    │  agent "MIB2 (wan port)"│              ╱ 23
    └─────────────────────────┘
        translation
        {
            mediaType = -100
            mediaSpeed = ifSpeed%
            operStatus = ifOperStatus%
            operStatusLastChange = ifLastChange%
            variable1 = ifInUcastPkts + ifInNUcastPkts +
    ifInErrors + ifInDiscards + ifInUnknownProtos
            variable2 = ifInOctets
            variable3 = ifInNUcastPkts
            variable4 = ifInNUcastPkts + ifOutNUcastPkts
            variable10 = ifInErrors
            variable9 = ifInDiscards
            variable16 = ifInUnknownProtos
            variable22 = ifInUcastPkts + ifInNUcastPkts +
    ifOutUcastPkts + ifOutNUcastPkts + ifInErrors + ifInDiscards
    + ifInUnknownProtos
            variable23 = ifInOctets + ifOutOctets
            variable24 = ifInErrors + ifOutErrors
            variable25 = ifInDiscards + ifOutDiscards
        }
```
}

╱ 22 dataSourceType *dataSourceType* presVarListName *presVarListName* protocol *protocol*

FIG. 2

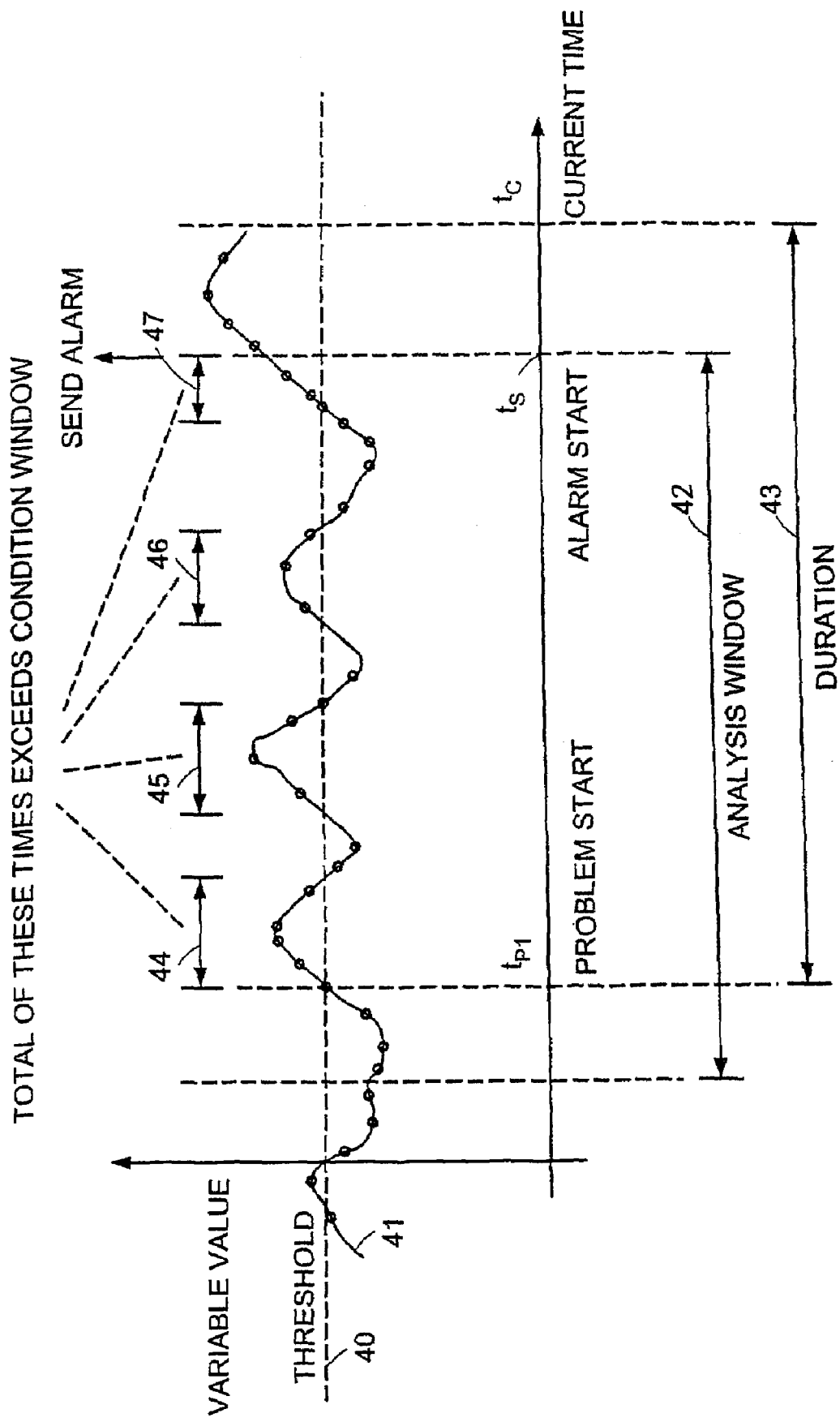

SYSTEM AND METHOD FOR DISPLAYING HISTORICAL PERFORMANCE OF AN ELEMENT ON A NETWORK

This application claims priority from U.S. Pat. No. 7,490,145, entitled "Liveexception System," and filed Jun. 21, 2001.

TECHNICAL FIELD

This invention relates to network monitoring, and more particularly to a system for identifying problems on a network, e.g. a large, widely distributed network.

BACKGROUND

In general, network elements include computing and storage devices, communication devices, software residing on these devices, etc. Examples are computes, disk storages, routers, switches, LANs, WANs, servers, and application software. Each element typically has a number of characteristics, or management variables, indicating its operating status. The management variables of an element are generally monitored so that problems occurring in the element can be detected and resolved. One approach for monitoring the elements is by polling. That is, a poller periodically gathers current status from the element being monitored. The gathered data is then sent to a processing unit that determines whether a problem has occurred in the element, and if so, a notification is generated.

Every network element provides a protocol for the poller to read and write its management variables. These variables are usually defined by vendors of the elements, and are usually referred to as a Management Information Base (MIB). There are some standard MIB's, such as the IETF (Internet Engineering Task Force), MIB I and MIB II. Through the reading and writing of MIB variables, software in other computers can manage or control the element. The software in other computers is usually called an agent. Thus, a network manager who is charged with the responsibility of locating and resolving network problems usually uses MIBs variables and agents to gather information from the elements.

Unfortunately, there is not a uniform MIB that can be used to manage a network consisting of elements supported by different vendors. Every MIB from every vendor uses a different set of messages to announce a network event, e.g. a fault. In general, these messages use a widely adopted messages format, known as a Simple Network Management Protocol (SNMP) trap. A network manager generally has to manually configure every element to generate SNMP traps properly. Even after traps are properly generated, there is rarely consistency in what each represents across different types of elements.

In addition, the amount of data that is retrieved by the pollers can be overwhelming in volume. This volume of data can present a serious problem to the network administrator who needs to decipher the true significance of all of the information.

SUMMARY

At least in part, the invention is embodied in a LiveExceptions system, referred to herein as simply "LiveExceptions," which is a network management system designed to provide notifications of potential problems within networks, systems, and applications. Problems like high latency, unusual workload or failures often require the immediate attention of a network manager. However, it is sometimes very difficult to provide a timely and reliable notification, or alarm, when a problem occurs. The problem may go undetected due to lack of information regarding the problem source, or the alarm associated with the problem may go unnoticed due to the presence of too many other false alarms. LiveExceptions increases the accuracy of alarm generation by utilizing a comprehensive storage of historical data for every element in the network being monitored. With the historical data, LiveExceptions is able to adapt to the behavior of the element as time progresses, and to generate an alarm only when the behavior deviates from its norm. In some situations, an element's behavior is dependent upon the time of a day, and the day of a week, LiveExceptions takes advantage of this time-and-day dependence and further optimizes its adaptivity, thus increasing the overall accuracy of the alarm generation.

In general, in one aspect the invention features a method of monitoring an element in a computer network. The method includes monitoring a preselected variable relating to that element; defining a threshold for the monitored preselected variable; establishing a sliding window in time; repeatedly generating a time above threshold value; detecting when the time above threshold value exceeds a condition window value; and in response to detecting when the time above threshold value exceeds the condition window, generating an alarm. In this case, the time above threshold value is a measure of an amount of time during which the monitored variable exceeded the threshold during the sliding window of time.

Preferred embodiments include one or more of the following features. The method also includes after generating an alarm, maintaining the alarm at least as long as the time above threshold value exceeds a clear window value. The clear window value is equal to the condition window value. The method also includes monitoring a plurality of variables relating to the element; and for each of the plurality of monitored variables, defining a corresponding threshold for that other variable, wherein the time above threshold value is a measure of an amount of time during which any one or more of the monitored variables exceeded its corresponding threshold during the corresponding sliding window of time. The step of defining the threshold for the preselected variable involves computing an average value for the preseleted variable based on values obtained for the preselected variable over a corresponding prior period; defining an excursion amount; and setting the threshold equal to a sum of the average value plus the excursion amount. The corresponding period of time is less than a day, e.g. a particular hour period of a day. The step of computing the average involves computing a mean value for the preselected variable using values obtained for that preselected variable for the same hour period of the same day of the week for a predetermined number of previous weeks. The step of defining an excursion amount involves computing a standard deviation for the preselected variable based on values obtained for the preselected variable over a predetermined period of time; and setting the excursion amount equal to K times the computed standard deviation, wherein K is a positive number. The step of computing the standard deviation involves computing the standard deviation using values obtained for that preselected variable for the same hour period of the same day of the week for a predetermined number of previous weeks. The step of defining the threshold for the preselected variable involves defining an excursion amount; and setting the threshold equal to H less the excursion amount, where H is a positive number. The step of defining an excursion amount involves computing a standard deviation for the preselected variable based on values obtained for the preselected variable over a predetermined period of time; and setting the excursion amount equal to K times the computed standard deviation, wherein K is a positive number.

In general, in another aspect, the invention features another method of monitoring an element in a computer network. The method involves defining for that element a profile that includes a plurality of different alarm rules, each of which establishes an alarm test for a corresponding one or more variables. It also involves detecting when the alarm test for any one or more of the plurality of different alarm rules is met; repeatedly generating a time above threshold value that is a measure of an amount of time during which any one or more of the alarm tests has been met during a preselected prior window of time; detecting when the time above threshold value exceeds a condition window value; and in response to detecting when the time above threshold value exceeds the condition window, generating an alarm.

In some preferred embodiments, the method also involves, after generating an exception, maintaining that exception at least as long as the time above threshold value exceeds a clear window value.

In general, in still another aspect, the invention features a method of displaying on a computer display screen historical performance of an element on a network. The method includes monitoring performance of the element; for each of the plurality of time slots, deriving a measure of performance for the element from its monitored performance; for each of a plurality of time slots, computing an average value for the measure of performance of the element; and, for each of the plurality of time slots, computing a variability for the measure of performance; on the computer display screen and for each of the plurality of time slots: (1) displaying a first indicator of the computed average value for that time slot; (2) a second indicator of the computed variability for that time slot; and (3) a third indicator of the derived measure of performance for that time slot.

In general, in another aspect, the inventions features programs which implement the functionality described above.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is an example of a MIB Transformation File (MTF) that is stored in the poller module.

FIG. 5 illustrates the time over threshold algorithm.

Like reference symbols in the various drawings indicate like elements.

DETAILED DESCRIPTION

The LiveExceptions System: a General Description of its Components

Figure 1:
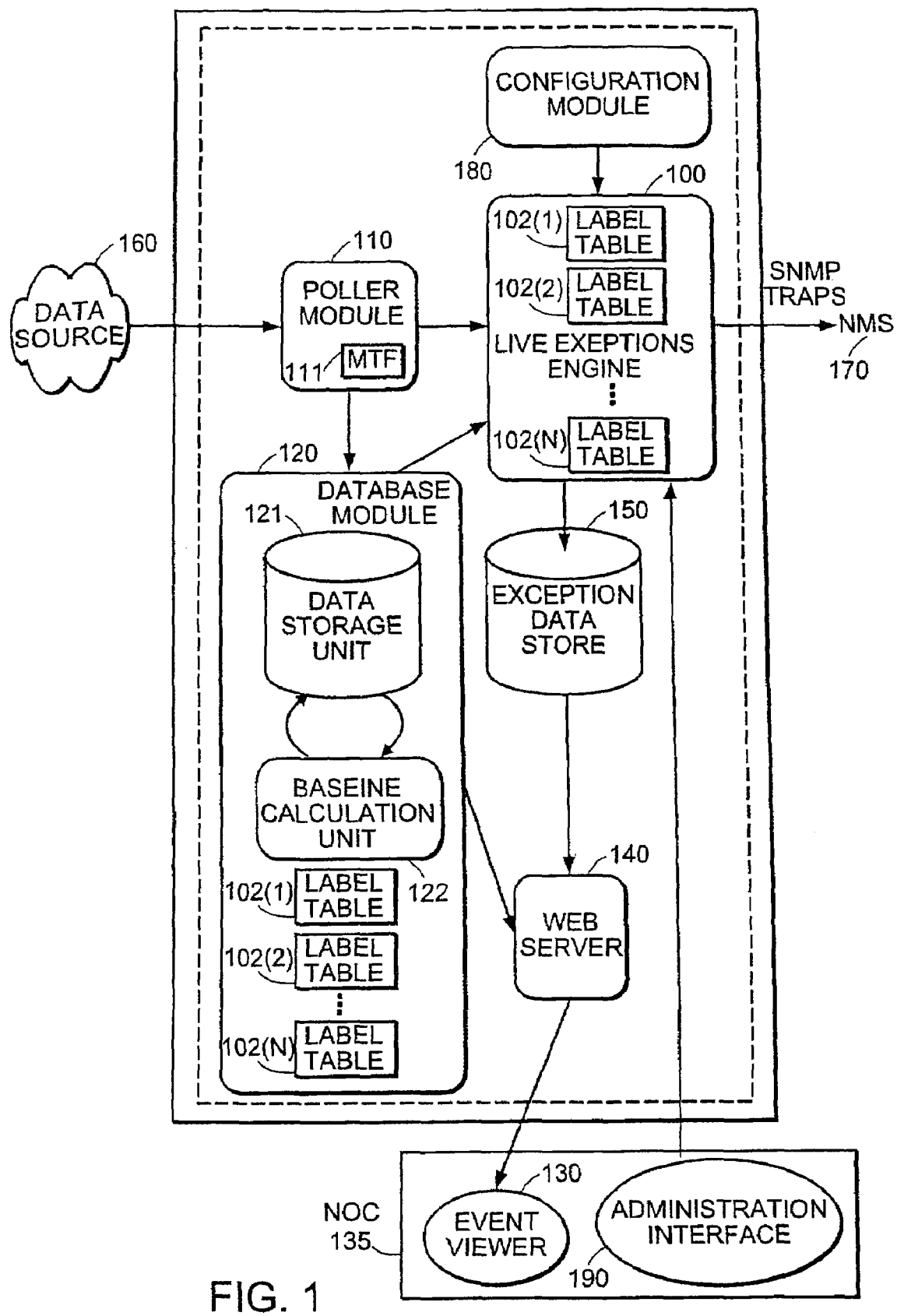
FIG. 1 is a block diagram of the LiveExceptions problem detecting and reporting system.

The overall structure of the LiveExceptions problem detecting and reporting system 10 is shown in FIG. 1. System 10 has a poller module 110 that gathers data from MIB variables of elements in a data source 160 (e.g. a network). The data from each of the MIB variables is then transformed into intermediate data by poller module 110 and stored in a database module 120 for trend report generation. Database module 120 includes a data storage unit 121, which stores the intermediate data; and a baseline calculation unit 122, which converts some of the intermediate data into variables meaningful to a user, computes statistics of the variables, and sends the computed statistics back to data storage unit 121. Whether statistics are computed depends on rules stored in a LiveExceptions Engine (LE Engine) 100.

A transformation function implemented in poller module 110 normalizes the raw data received from the network. The normalized data represents a more condensed form of the data than the original raw data received from the polling. On each poll, poller module 110 sends the normalized data to LE Engine 100, which in turn retrieves the computed statistics from data module 120 when appropriate.

The statistical calculations that are required by some of the rules generally, but not always, involve computing statistics such as the $1^{st}$ and $2^{nd}$ moments. The rules in LE Engine 100 specify the particular variables of interest for which such statistics are to be computed. Since the computed statistics usually sufficiently characterize the relevant variables of interest, using the computed statistics, instead of the raw data or the normalized data, tends to increase the accuracy in problem detection in a wide variety of situations. In addition, the statistics take up much less storage space than do the normalized data from which they are derived.

In the described embodiment, poller module 110 typically polls the MIBs from which it retrieves as often as once every 5 minutes and it stores and maintains six weeks worth of the polled data. Of course, the polling frequency and the period for which data is collected can vary widely depending upon the requirements of the network manager. In any case, considering the large number of variables that would typically be monitored, the volume of data, even when stored in the condensed form, can take up a significant amount of storage space.

The LE Engine

LE Engine 100 receives normalized data from poller module 110, and statistics from database module 120. LE engine 100 computes values for the monitored variables from the normalized data. The computed variables are defined in label tables stored in LE Engine 100. It then compares those computed values to statistics that were computed for those variable according to particular rules which apply, and determines if a problem has occurred in the element from which the polled data was retrieved. If the comparison indicates the existence of a problem, LE Engine 100 generates an alarm or a number of alarms, each of which indicates a problem relating to the monitored network elements. After a problem is detected and an alarm is generated, that alarm is sent to an exception data store 150 and also to a Network Management System (NMS) 170 in the form of a SNMP trap. System 10 further includes a web server, which receives the alarm from exception data store 150 and forwards it to an event viewer 130. Event viewer 130, which is a GUI browser, displays the alarm in a Network Operation Center (NOC) 135 and on various network manager workstations so that the problem can be quickly identified and responded to by a network manager.

Configuring the LE Engine

LE Engine 100 is the core processing unit of system 10. For LE Engine 100 to operate according to desired rules for selected elements, a number of items and parameters need to be defined for it, such as elements, variables, alarm rules, and length of observation time. These items and parameters are defined in configuration files stored in LE Engine 100. System 10 has a set of predefined configuration files that are suitable for various situations. But it also allows a user to customize the configuration files to satisfy particular user needs.

Configuration Change

A user makes configuration changes through an administration interface 190 or a configuration module 180, or the user can import a file containing required configuration changes. Upon receiving the changes, LE Engine 100 updates the states of its internal data structures to reflect the changes while continuing its normal operations. After the changes are implemented in the configuration files, LE engine switches to the new items and parameters without having to re-start or re-compile.

In the described embodiment, Engine 100, poller module 110, database module 120, exception data store 150, web server 140 and configuration module 180 are housed in a single unit or compartment.

Variable Evaluation

If there is a problem with an element in the network, the problem is detected by evaluating variables associated with that element. The evaluation is based on a number of factors, which generally include polled data gathered by poller module 110, historical information from database module 120, and a number of pre-defined rules. Each of these factors will be discussed as follows.

Two-stage Transformation—the MTF

Poller module 110 polls MIB variables at a pre-defined rate, e.g. every 5 minutes, by using their Object IDs (OIDs). Each of the OIDs points to a unique MIB variable. The polled MIB variables are then combined so as to remove redundant information. The pre-defined normalized forms and the transformations between the normalized forms and MIB variables are defined in a MIB Transformation File (MTF) 111 stored in poller module 110. MTF's are used in connection with the commercially available Network Health product sold by Concord Communications, Inc. and documentation generally describing MTF's is provided for that product. For example, see the document entitled Network Health—Customizing Variables (a copy of which is attached hereto as Appendix A).

The MTF Data Types

MTF 111 is used to transform a MIB variable into a normalized form. A number of normalized forms are pre-defined for each element type, for example, Ethernet, Token Ring, WAN, Frame Relay, Asynchronous Transfer Module (ATM), remote access devices, routers, servers, etc. The normalized form has two data types: counters and gauges. A counter is a non-negative integer which monotonically increases until it reaches a maximum value, after which it wraps around and starts increasing again from zero. Examples of a counter generally include number of bits, number of seconds in latency, or number of frames. A gauge is a non-negative integer which may increase or decrease, and examples of a gauge generally include percentage of bandwidth utilization, collision percentage and percentage of bad polls.

The MTF Format

Referring to FIG. 2, an MTF 111 is an ASCII text file defining a transformation for a MIB that needs to be translated. MTF 111 includes three main sections: a support information section 21, a data source information section 22, and a translation information section 23. Support information section 21 includes a file name for the MIB being translated by this MTF, a MTF version number, and parameters that indicate whether an element defined in the file name is polled, how it is polled, and how it is reported. Data source information 22 provides information concerning response elements. It indicates the type of data that poller module 110 collects as well as configuration parameters and protocols used by the element. Translation information section 23 contains a number of expressions, or equations, that map MIB variables to normalized forms.

Extensible Feature

An appealing feature of MTF 111 is its extensibility. As described before, a network system usually includes elements from different vendors, each defining and organizing its proprietary MIB variables in a proprietary way. By using the normalized forms defined in an MTF 111, a user is able to integrate standard and proprietary MIB variables into the same format for analysis and reporting.

When an element from a new vendor needs to be integrated into the existing network, a user simply writes an MTF 111 utilizing default or customized normalized forms to define the transformations for the MIB variables associated with the element.

Efficient Storage

A single normalized form is usually used by MTF 111 to convert many MIB variables. Typically, the number of normalized forms is less than thirty for each element type, i.e., a number that is typically far less than the number of the different MIB variables poller module 110 handles.

The following example illustrates the concept of using normalized forms to achieve reduced storage requirements. Five MIB variables, MV1, MV2, MV3, MV4 and MV5 are mapped to three normalized forms NF1, NF2 and NF3. The five variables are computed as a combination of the three normalized forms. Because the three normalized forms contain sufficient information to produce the five variables, it is therefore only necessary to store NF1, NF2 and NF3 in the database and the transformations, i.e. Eq. 1 to Eq.5, in MTF 111.

$$MV1 = NF1 + NF2 \tag{Eq. 1}$$

$$MV2 = NF2 + NF3 \tag{Eq. 2}$$

$$MV3 = 2*NF1 - NF2 \tag{Eq. 3}$$

$$MV4 = 3*NF1 + NF3 \tag{Eq. 4}$$

$$MV5 = NF1/NF3 \tag{Eq. 5}$$

Other features of MTF 111 are described in the appended document "Network Health—Customizing Variables" (See Appendix A).

Two Stage Transformation—The Label Tables

Referring again to FIG. 1, when historical information is needed, LE Engine 100 retrieves it from database module 120. The retrieved information is normalized data, and LE Engine 100 further translates it into a variable more meaningful to the user. The variable is assigned a unique label, and a row in one of a set of the label tables 102(1-n), referred to herein generally as label tables 102. The variable in label table 102 represents a characteristic of an element that is typically more meaningful to users than MIB variables. For example, variables in the label table 102 might include bandwidth, percentage of utilization, number of errors, bits_in, bits_out, just to name a few. Label tables 102 in LE Engine 100 store the conversions between normalized forms and these variables. The same label tables 102 are also stored in database module 120 and are used by baseline calculation unit 122 to also compute needed statistics.

In short, the variable that a user sees displayed in NOC 135 has typically undergone a two-stage transformation: it was transformed from a MIB variable to normalized data, and then from normalized data to the variable. A simple example illustrating the value of performing such transformations is as follows. In the MIB, the agent stores "good frames received" and "bad frames received". MTF 111 normalizes those to "frames received" as a count by summing the two counts. Label table 102(1) then takes "frames received" and divides by a delta time to obtain the "frames in rate" measured in frames/sec. Another label table 102(2) takes "bytes received" and divides by "frames received" to derive the "average frame size". Thus, similar to the concept of reusing the normalized form in MTF 111, a single normalized form is usually used by label tables to compute multiple different variables.

The various label tables that have been defined for Live-Exceptions are presented in Appendix B attached hereto.

One advantage of using label tables is that they make adding or deleting variables in reports much easier. When a user makes a new variable available to reports, he only needs to add a new label in the one of the label tables for that variable and this avoids having to modify other modules in the system. Similarly, a variable can be deleted by only having to modify a label table and not other modules.

Exception Generation

After LE Engine 100 receives the polled data from poller module 110 and converts it into a variable by a transformation defined in a corresponding one of the label tables, LE Engine 100 applies a rule to the variable to determine if a problem associated with that variable has occurred. If the problem has occurred, LE Engine 100 sends a notification to inform network managers. The notification is in the forms of a SNMP trap and an alarm. Alarms can be consolidated to signify a problem associated with a number of related elements. These alarms form an alarm set, which is call an exception.

The detection of a problem is specified in the LiveExceptions system via the alarm rule. Alarm rules are of two types, namely a simple alarm rule and a compound alarm rule. The simple alarm rule describes a condition which must be satisfied by a single variable defined on a single element. The user may specify:

The element type

Selection of an alarm based on variable, reachability or availability

A variable (e.g., BandwidthUtilization or TotalErrors)

An analysis window

A condition window

Whether to watch for time over threshold, time under threshold, or unusual value above, below, or outside (above or below) the mean.

An alarm severity: normal, warning, minor, major, critical

Each of these is described more fully below in connection with two examples of specific alarm rule types.

The compound alarm rule is a conjunction of two or more simple alarm rules. Users may select this conjunction via a GUI which is provided in the system. A compound alarm rule allows the specification of a different variable and thresholding condition on the same element.

Conjunctive rules implement an "and" of two sets of simple rule conditions. At each poll of the data variables, both variables of the two rules must meet their defined threshold conditions in order to add to the accumulated condition window time. For example, if the compound rule specifies a 5 minute out of 60 minute time condition, then if at a poll both variables are above their thresholds, 5 minutes will be added to the accumulated alarm time. If only one of the variables is above its threshold, no time will be added.

To make the alarm rules useful, they are applied to the data generated by an element. It would be very cumbersome for the user to specify each desired alarm rule to be applied to each desired element, so the system provides for alarm rule profiles. A profile 320 is applied to a group 330 or a group list 30 of elements. Profile 320 is typically defined for some specific technology and use. For example, a profile can be defined for a group of elements that form a backbone ATM WAN link. Every profile is populated with rules that detect problems associated with a specific use.

System 10 provides a number of predefined profiles that are applicable to a wide variety of element groups found in industry. Administrators can also define profiles that describe the criteria by which they want to manage their network. The kinds of profiles and problems each profile detects generally include:

Delay profiles, which raise an alarm when an element is contributing to delay, either by being over utilized, or if we detect congestion.

Failure profiles, which raise an alarm when an element in the associated group is down. They also raise an alarm if the relevant element is suffering too many errors and thus has effectively failed, or if it is in danger of failing, e.g. it is running out of some key resource.

Unusual workload profiles, which raise an alarm if the workload presented to an element, or the work done by an element is unusual when compared against a historical time period.

Host latency profiles, which raise an alarm if the latency to a host is unusually high, or beyond any reasonable limit.

Response profiles, which raise an alarm if response time problems are detected. Each profile is described in a separate table, with an entry in the table for each alarm rule (or set of closely related rules).

In addition to a set of predefined profiles which are provided with the system and which are applicable to a wide variety of situations found in industry, users can also create their own profiles. A list of profiles that are supported in the described embodiment are presented in Appendix C and Appendix D, attached hereto.

In general, a profile is typically defined for some specific technology and use, such as backbone ATM WAN links. Each profile is typically populated with rules which detect conditions appropriate to this use. Exceptions are tied to elements and profiles to distinguish the status of an element with respect to these uses. Each such exception/profile pair is displayed as a separate row entry in the LiveExceptions browser. For example, suppose a frame relay link endpoint element is defined, Acme-NY-Boston-link-5. Further, suppose we are measuring the latency from this endpoint to its far end, and that we are also measuring the dropped frames from this endpoint. Rules which define conditions on these variables exist in two profiles, FrameRelayLinkLatency and FrameRelayLinkDroppedFrames. Each of these profiles has different consequences for SLA issues, and each will show exceptions separately:

| Element | Severity | Description | Profile |
|---|---|---|---|
| Acme-NY-Boston-link-5 | Critical | Dropped Frames Exceeds 2% | FrameRelayLinkDroppedFrames |

-continued

| Element | Severity | Description | Profile |
|---|---|---|---|
| Acme-NY-Boston-link-5 | Major | Latency Above 100 msec | FrameRelayLinkLatency |

In the above example, the increase in dropped frames is more likely to lead to a user's inability to utilize agreed-upon bandwidth. A high latency, while an important indicator of performance, does not necessarily lead to the loss of throughput which would violate an SLA. Were these exceptions combined as an overall element status (without regard to profile), this distinction would not be readily apparent.

A profile is applied to a group of elements or a group list via a Subjects-to-Monitor dialog in the LiveExceptions Browser. This has the effect of applying each rule in the profile to each element in the group which matches the element type of the rule.

Groups and group lists are known concepts in the field of network monitoring. In general, a group is a list of elements that might have some feature or technology in common, e.g. they might be a set of elements of a similar technology (e.g. disks). A group might also be some combination of elements for which a network manager would want to learn similar types of information. A group list is a collection of groups that might have a more general relationship to each other, e.g. different storage device types.

Once profiles and groups are associated with each other, the LiveExceptions system begins to monitor the flow of polled data from the specified elements and generates alarms accordingly.

Figure 3:
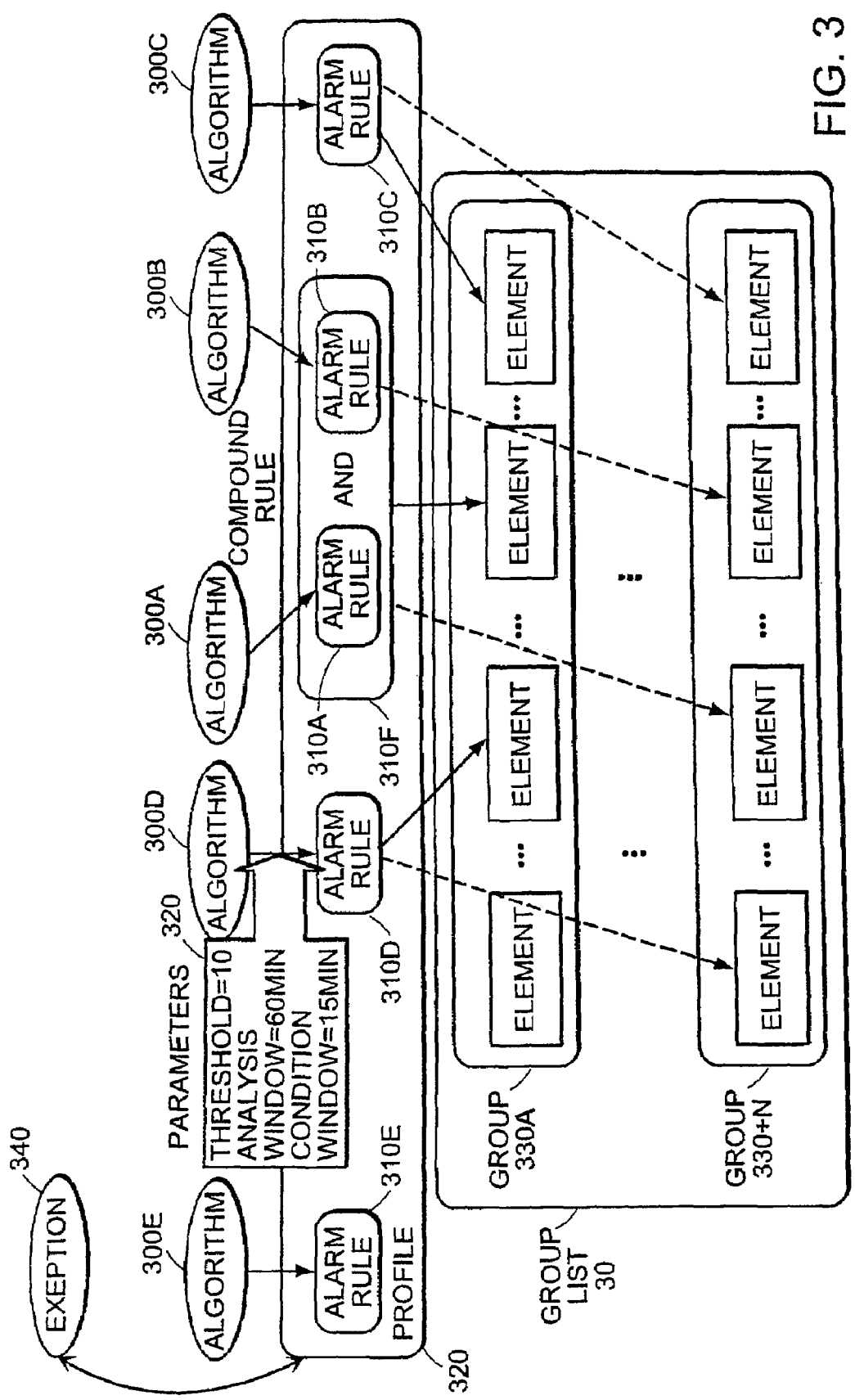
FIG. 3 illustrates the relationships among alarm rules, profiles, groups, group lists and exceptions.

Referring to FIG. 3 visually depicts the relationship among alarm rules, profiles, groups and group lists. LiveExceptions includes a family of algorithms 300 for detecting problems. Algorithms 300 are implemented in LE Engine 100 as background processes that monitor the data collected by poller module 110. Algorithms 300 are invoked by alarm rules 310 that are written in a profile 320. A profile can be applied to a group or a group list. In FIG. 3, profile 320 is applied to a group list 30, which includes a number of groups 330(1-n). Each group usually represents a specific use, while group list 30 usually represents a more general use. Profile 320, together with the associated groups 330 group list 30, instruct LE Engine 100 on which elements to monitor, and when to raise alarms. Alarm rule 310 is defined on a problem detection algorithm 300, and in addition, it also contains a set of parameters 320 that control the algorithm, such as thresholds, analysis windows (i.e. baseline periods), and condition windows, etc.

FIG. 3 also depicts a compound alarm rule. In the illustrated example, alarm rule 310A is AND'ed with alarm rule 310B to form a compound alarm rule 310F. This compound rule raises an alarm only when all simple alarm rules in the compound rule calls for an alarm to be raised.

An exception 340 combines all the alarms generated within profile 320 and produces a single output at a given time. When exception 340 occurs, LE Engine 100 sends a trap to NMS 170, and also causes it to be displayed on event viewer 130. An alarm has a number of severity levels, each level is defined in terms of the amount that a value deviates from its normal value. The severity of an exception is the maximum severity of all individual alarms defined within the corresponding profile.

An exception combines the states of one or more alarms defined on an element. The severity state of an exception is the maximum severity of all the alarms currently active on an element, within a given profile. When no alarms are active on an element, the first alarm to be raised generates an exception. Thereafter, subsequent alarms raised and cleared simply change the severity of the exception. When the last alarm constituting an exception clears, the exception itself is said to be cleared.

Figure 4:
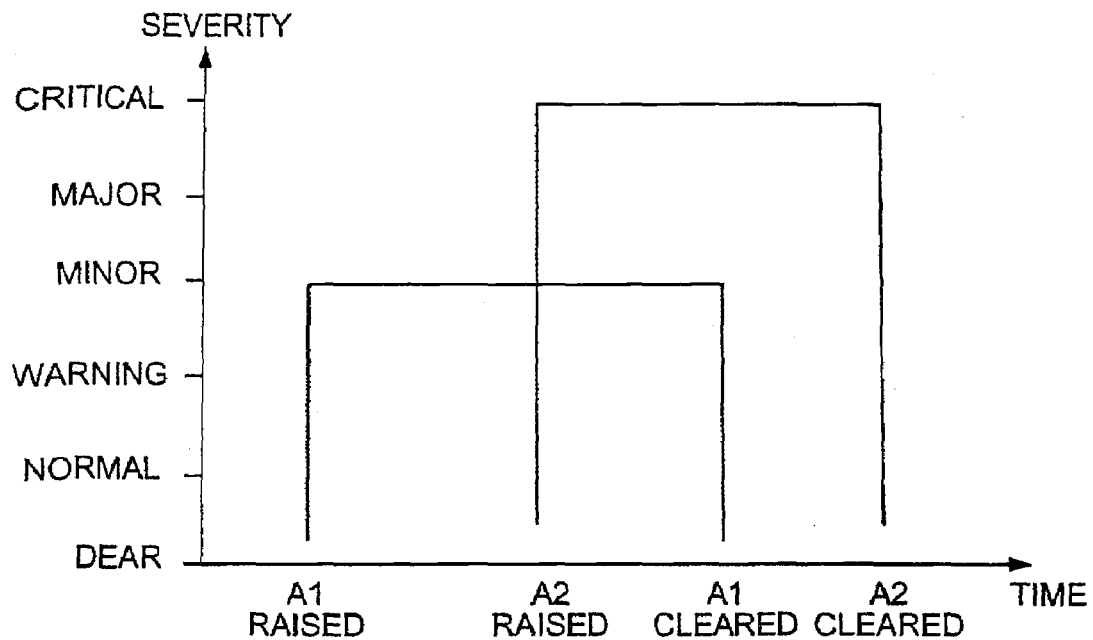
FIG. 4 illustrates the determination of the severity of the alarm.

Referring to FIG. 4, two alarms a1 and a2 are defined on an element a1 is a minor alarm, and a2 is critical. The following events ensue:

When a1 is raised, an exception is generated with severity minor.

When a2 is raised, the exception is updated to severity critical.

When a1 clears, the exception severity remains critical.

When a2 clears, the exception is cleared.

Alarm Rule Algorithms

Time Over Threshold

One key approach to detecting problems involves using the history of the monitored data. A particularly simple way of doing this is illustrated by the time over threshold rule, the operation of which can be more easily understood by referring to FIG. 5. In general, as LiveExceptions accumulates polled data for a particular variable, LE engine 100 looks at that data over an interval of time, referred to as an analysis window 42, which in the described embodiment is typically an hour though it could be longer or shorter depending upon the circumstances and performance needs. LE engine 100 compares the data values in this interval with a predefined threshold 40, and computes the total time that the value is over the threshold. In the illustrated example, the accumulated time is the sum of intervals 44, 45, 46 and 47. If this total time is greater than a predefined amount, referred to as a condition window, LE engine 100 raises an alarm and sends out a trap to the NMS.

The wall time at which an alarm is raised is the alarm start time, $t_s$. The wall time at which the data value initially crossed the threshold that subsequently led to the alarm is the problem start time, $t_{p1}$. The time from the problem start time to the current wall time is the duration 43 of the alarm. Through its browser interface located in the event reviewer, LiveExceptions displays each of these times to the user.

When an alarm is raised, it is said to be active. Analysis continues using the same parameters which induced the raising of the alarm. The alarm continues in an active state until its conditions are no longer satisfied, at which time the alarm is cleared, thus becoming inactive.

As time progresses, as long as the total time over threshold 40 in analysis window 43 still exceeds the condition window, the alarm remains active but no further traps are sent to NMS. LE Engine 100 clears the alarm when the accumulated time over threshold 40 in analysis window 43 no longer exceeds the condition window. When the accumulated time no longer exceeds the condition window, LE Engine 100 sends another trap to the NMS notifying it that the alarm condition is now cleared.

It is important to note that the analysis window 42 continues to slide along the time axis after an alarm becomes active, continuing to watch for time over threshold conditions as time advances. This means that the alarm will not clear capriciously, reducing the probability of "flapping" alarms—those which continually assert themselves even though a troublesome condition has been posted and is well known by operators.

While simple, the time over threshold rule is very powerful. Transient problems—brief spikes in the data—do not raise an alarm. However, recurring spikes do raise an alarm. This draws an important distinction between quick spikes which would be mere annoyances should they trip an alarm, and a series of such spikes which should demand attention. In addition, continuous time spent over the threshold also raises an alarm, indicating a persistent condition that should be corrected.

As indicated previously, at least the following parameters are settable by the user through the interface or by other means:

Threshold—which is the data value above which time is accumulated.

Analysis Window—which is the time interval within which time is accumulated.

Condition Window—which is the total time required to be spent by the data value above the threshold which causes an alarm to be raised.

In addition, LiveExceptions enables a user to select, through different rules, variations on the time over threshold theme, as will be discussed below.

Note that the actual monitored data is in the form of a series of individual data points, with a data point for each polled period. However, for visual effectiveness, the user interface displays these not as individual data points but rather as a line graph interconnecting the individual points.

Time Over Threshold for Availability and Reachability

The basic time over threshold rule is modified to determine the reachability or availability of an element.

Availability and reachability are important special cases in the LiveExceptions rule definitions. Reachability is defined as the ability of the poller to communicate with the device containing an element. To be reachable, a device must respond to ICMP pings. An indicator of whether a device is reachable is generated by the poller for use by the LiveExceptions system on each poll of the device.

Availability is more complex. Its definition is time-dependent. The poller assesses properties of the device such as reboots (via sysUpTime), and if OperStatus (or equivalent), when defined by the device. Availability is generally not known by the poller until it successfully polls the device, so an immediate value is not always obtainable on each poll.

The availability algorithm detects when an element is unavailable. LiveExceptions clears the alarm once it becomes apparent from the polled data that the element has been up for at least the length of the window defined in the alarm rule. In this case, the purpose of the window is to raise a single alarm when an element is "bouncing" up and down repeatedly.

For hosts, routers, switches, servers, and remote access servers (RAS), when the host goes down, it will not be possible to ping or poll the host's agent. This will be seen as a Reachability problem first. Later, when the host reboots and comes back up, it will be possible to ping and poll the host's agent again. At that point, LiveExceptions will see that the host has rebooted, and was down, and will raise an alarm at that time.

When the child elements within LAN and WAN interfaces, modems, ISDN, CPUs, disks, partitions, processes, process sets, and response paths hosts, go down, the host's agent may remain up and can be pinged and polled. In those cases, LiveExceptions can detect that the child has gone down when it polls the element, and will raise an alarm immediately.

Reachability is defined by whether or not an element can be pinged, i.e. if a query can reach an object and its response can be received. Availability is determined by whether or not an element is functioning, i.e. it is up or down. A non-reachable element will generate an alarm at the moment when poller module 110 is unable to reach it, but the alarm is cleared only after the element becomes reachable again for the amount time specified by the analysis window. Availability works in the same way.

The reachability algorithm detects when a ping of an element's agent IP address fails.

For hosts, when the host goes down, the agent address stops responding to pings and a reachability alarm is immediately raised for the host. The normal sequence of events when a host goes down is:

1. The host goes down.
2. The host's agent IP address is pinged, the ping times out and the ping is retired. When all the tries time out, the ping fails and a Host Unreachable alarm is raised.
3. Eventually, the host reboots and comes back online.
4. The host's agent IP address is pinged and the ping succeeds. The host' agent is then polled and it is learned that the host rebooted, and that the host was unavailable for some time. A Host Down alarm is raised at that point.
5. If pinging of the host's agent IP address succeeds for a continuous time equal to the window defined in the rule, the reachability alarm is cleared.

Most child elements within a host, have the same agent IP address as their host parent. An IP address is only pinged once, and the results of that ping are used for all the elements with the same address. All the children have the same reachability as their parents. The default profiles therefore do not define reachability alarm rules for children. Instead these are limited to parent hosts.

This modified rule is simpler than the basic time over threshold rule because it does not require a threshold. When an element or an application is down, it immediately generates an alarm. Furthermore, in a real system, it is common for an element or an application to go through cycles of ups and downs. The modified rule, like the basic rule, is able to consolidate the problematic behavior and reports it to NMS 170 in one trap.

Time Over Dynamic Threshold (i.e. Unusual Value Rule or Dynamic Rule)

The simple time over threshold rule uses a constant threshold value. A time-varying threshold—one that depends on historical data—is also used in a number of other rules. One such variation defined by LiveExceptions utilizes the "normal" value for a variable at a given time of day.

Over a period of time, a series of data values will possess a distribution among the values presented. A distribution is normally summarized by its mean and standard deviation, concepts derived from the normal or "bell curve" type of distribution commonly found in many kinds of statistical measurements. The statistical standard deviation is a particularly useful indication of deviation from a normal value. The mean is simply the average value over the set. The standard deviation measures the average "width" of the deviation of the values from the mean. It is a measure of the likelihood that a particular series of values will "veer off" from its current trajectory. Sometimes, users wish to know when a value plus its standard deviation are above some threshold, i.e., when the value is getting "too close to the edge." This is the idea behind the time over dynamic threshold rule or unusual value rule.

LiveExceptions stores a normal (or baseline) value for each hour of the day, computed as the average value for that hour over the preceding six weeks. In the case of the time over dynamic threshold rule, LiveExceptions compares the current data value to the normal value. Alarms are defined on the normal value and indicate that a certain amount of time was spent beyond a given deviation from the normal value.

This is expressed in LiveExceptions as a percentile. The percentile of a set of values with respect to a given value is the percentage of the number of values in the set which are below the given value. For example, we might say that "50 is the $90^{th}$ percentile value", meaning that 90% of the values in a set are below 50. This is an accurate statement of real multiples of standard deviation as well.

In other variations of this rule type, LiveExceptions also allows the user to specify deviations by an ordinary percentage and by an absolute value.

Detecting an "unusual" value of a variable is illustrated in FIG. 2. The main difference between this type of rule and the time-over-threshold rule previously described is that the threshold varies with time. However, note also that contribution to the time over threshold in this case is not simply that the data value exceeds the threshold but it must exceed that threshold by the specified deviation as well.

Figure 6:
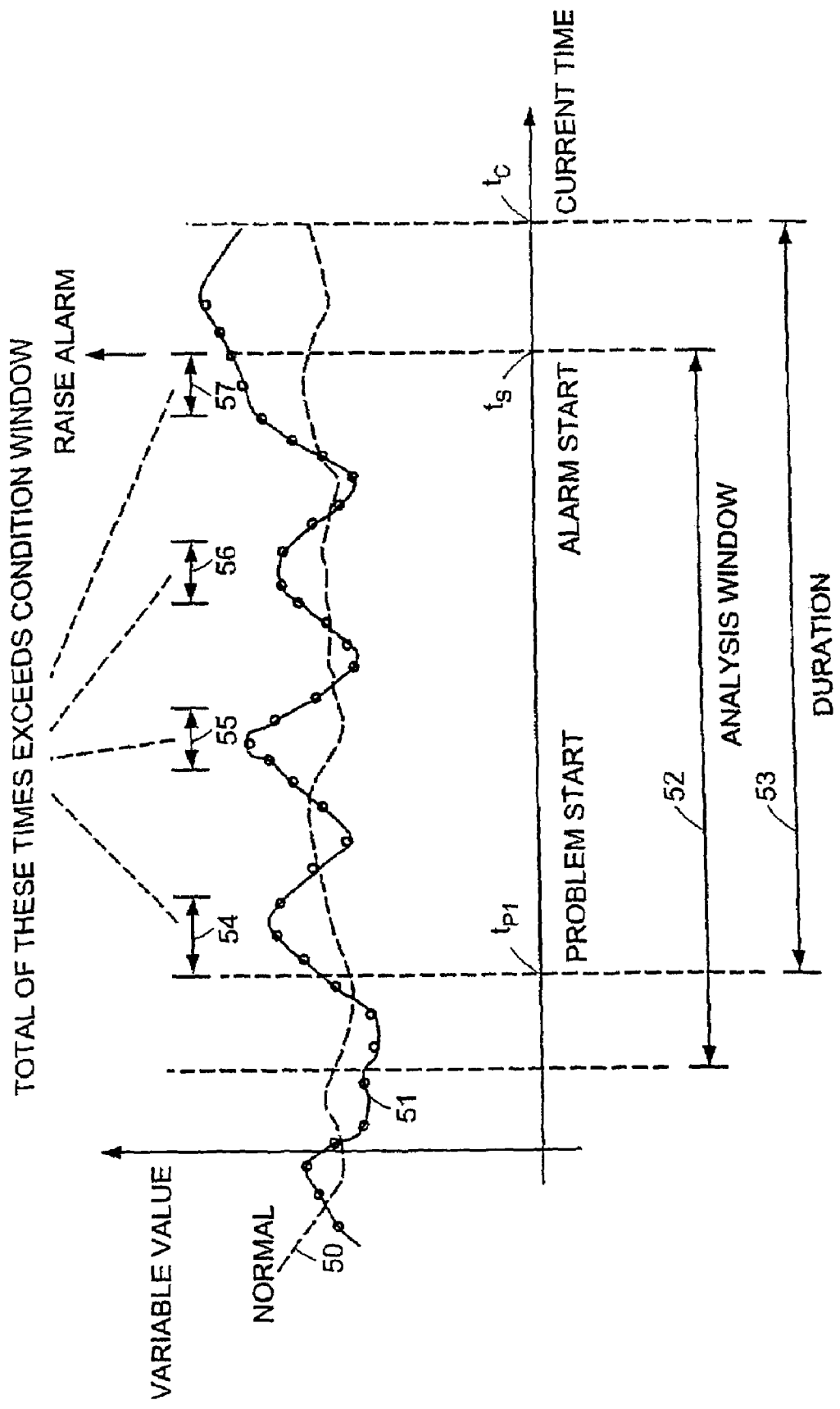
FIG. 6 illustrates the dynamic time over threshold algorithm.

FIG. 6 illustrates graphically how the dynamic time over threshold rule works. The dynamic time over threshold algorithm includes a normal value 51, i.e. a dynamic threshold value, an analysis window 52 and a condition window (a pre-defined fixed value, not shown). Normal value 50 is the value a data series cannot deviate by more than a certain amount, analysis window 52 is a sliding interval of time, and the condition window is a time threshold for the accumulated time during which the variable exceeds the mean by the predetermined amount (e.g. the sum of time intervals 54, 55, 56 and 57). The alarm generation process is similar to that used for the time over threshold rule illustrated in FIG. 5. One major difference between this rule and the time over threshold rule is that threshold 40 is replaced by a time-varying normal value plus a "deviation."

The time over dynamic threshold rule was initially developed to provide a good indication of potential disk space exhaustion. Since running out of disk space is possibly catastrophic, the user should be warned if there is a high probability that this space will be used up soon. This rule accomplishes precisely this, since the standard deviation is a good measure of how widely space usage is likely to swing over some time period. The user-defined threshold in this case is 100%. The default LiveExceptions profiles encode disk space rules using the time over dynamic threshold rule.

However, the time over dynamic threshold rule may be useful in any situation where exceeding some hard limit would have catastrophic results, or would in some manner ruin your whole day. Examples of such variables might be memory usage, bandwidth utilization for SLA, or utilization of a set of dial-in lines.

When defined on the appropriate variables, unusual value alarms provide an excellent indicator of possible system problems. For example, a high traffic rate on a router interface late at night may indicate a runaway program attempting to communicate with a remote server. Or, a high CPU utilization on a normally little-used workstation could inform operators of a change in use or of an inappropriate program running on the machine. In either of these cases, remedial action or an increase in capacity may be called for.

There are two ways to look at this rule. One is to reduce a user-defined threshold by the standard deviation, and use the result as the actual threshold with which to compare the data value. Since the standard deviation is computed dynamically from the data, this gives rise to the "dynamic threshold" term in the rule's name. The idea can be summarized by the following simple formula for determining when a value is over the threshold:

$$DataValue > UserThreshold - StandardDeviation$$

Another way to look at this rule is by the "too close to the edge" analogy. Rearranging the formula slightly provides this viewpoint:

$$DataValue + StandardDeviation > UserThreshold$$

Note that this rule differs from simply defining a reduced threshold in that the reduced threshold is computed automatically, keeping track of day-to-day swings in usage of the variable. There is thus no need for the user continually to adjust the threshold to the desired level of sensitivity.

Absolute from Mean Rules

Using an absolute from mean detects when a variable is above or below the mean by a pre-defined fixed amount. This rule is most useful for detecting when a value has changed from a fixed or a stable configuration. For example, it can be used to detect when a file system has been reconfigured and its capacity has been changed.

Percentage from Mean Rules

Using a percentage from mean detects when a value is above the mean by a percentage. For example, a 100% above the mean rule detects when the variable is twice its mean value. This rule is useful for detecting changes in a value, in proportion to the average value.

Deviation from Mean Rules

Using a deviation from mean detects when the variable is above the mean by a dynamic percentile. The percentile is computed dynamically based on the standard deviation. A user can specify a percentile parameter in the rule to indicate how far a value can deviate from its mean to stay within the normal range. The higher the percentile, the further from the mean the value must be to raise an alarm. Deviation from mean dynamically determines both the mean and the acceptable variations of the data. It adapts to cases where the mean changes but the variable stays very closely to the mean (i.e. a small standard deviation), and also to cases when the mean remains the same, but the variation from the mean is wide.

Algorithms can be combined. For example, the deviation from mean algorithm can be combined with the percentage from mean algorithm to prevent small divergences from normal from generating alarms.

Time Over Dynamic Threshold with Time of Day and Day of Week

Analysis window 52 for the dynamic threshold rule need not be constant in time. In fact, for a wide variety of network elements, the statistics of the associated variables tends to vary, depending on the time of a day, and the day of a week. For example, an Ethernet element in an office building typically has a higher usage during office hours in a weekday than an early morning hour on Sunday, and accordingly the percentage of packet collision fluctuates in the same way.

Therefore, the polled data for certain variables are grouped by the time, typically the hour, and the day in which they are collected. The statistics of the variables for that hour are computed and later combined to form the statistics for the entire analysis window.

Time Over Dynamic Threshold: Entire Time Range

A continuous time period can be used for detecting problems in some situations, for example, a potential disk space exhaustion. Since running out of disk space is catastrophic to a system, the user should be warned if there is a high probability that the disk space will be used up soon. In general, the basic time over threshold rule does not work in this situation because each disk partition has a unique threshold. However, the dynamic rule provides a good indication of how widely spaced usage is likely to swing over a certain time period.

EXAMPLE

Disk-partitioning

The time over dynamic threshold algorithm determines when a partition is nearly full by examining recent history of the associated variables over an analysis window of the past few weeks. The algorithm determines how much the partition utilization typically grows and shrinks over that period. It computes the variation seen in a variable over the entire analysis window. For disk partition problems, the variation is typically measured by its standard deviation.

Instead of using a specific time of the day and a specific day of a week, the statistics uses the entire time period in the analysis window. It is because the disk partition is generally not as sensitive to the time and day as other network elements. The dynamic rule is able to dynamically adjust itself to partitions with different characteristics, such as a rapid-changing partition space, a constantly full partition, or a partition with high but stable utilization, e.g. a system partition.

Historical Information at System Start-up

When system 10 starts up, LE Engine 100 is initialized and the basic time over threshold rule is used. Historical information is not used until after sufficient of data is collected to support the rule. Similarly, when a user changes profiles, new elements are initialized without historical analysis.

Data Statistics Stored in Database Module

If a rules defined for variables depend on their statistics (e.g. dynamic rules), baseline calculation unit 122 converts the associated normalized data into the appropriate variables and computes the $1^{st}$ and $2^{nd}$ moments of those variables. The computation is performed incrementally instead of by fully recomputing the statistics each time an update is required, and the results are stored in data storage unit 121 for LE Engine 100 to use as parameters of the rules.

There are at least two benefits of using an incremental computation method. One benefit is that it saves disk space. Moments are more compact than normalized data and yet they sufficiently characterize the data, at least from the perspective of what the rules require. Another benefit is related to the computation cost. The computation of the $1^{st}$ and $2^{nd}$ moments over the entire baseline period, i.e. the analysis window, consumes large amounts of time and processing power. The incremental computation uses much less of both and stores intermediate statistical results that can be reused.

Incremental Computation of First and Second Moments

In the deviation from normal algorithms, LiveExceptions uses an incremental computation of the mean and standard deviation of a variable over a baseline period. The process works as follows.

The mean, $\bar{x}$, and standard deviation, $\sigma_x$, of a variable, $x(t)$ over time can be computed for a time period $(T_0, T_1)$ using the formulas:

$$\bar{x} = \frac{\int_{T_0}^{T_1} x(t)\,dt}{(T_1 - T_0)}$$

$$\overline{x^2} = \frac{\int_{T_0}^{T_1} x^2(t)\,dt}{(T_1 - T_0)}$$

$$\sigma_x = \sqrt{(\overline{x^2}) - (\bar{x})^2}$$

The variables collected are constant over a poll period. This is because many variables are rates, computed by polling the values of a counter at the start and end of a poll period, and computing the difference in the counter divided by the difference in time. This rate is the value of the variable over the entire poll period. While the polls are done at roughly even intervals, the intervals will vary in length slightly, and on occasion, a sample may cover multiple poll periods. For example, if a sample cannot be taken for two polls in a row, the actual sample collected on the successful third poll will cover 3 normal poll periods.

For any given hour, the samples may not (and are unlikely to) align with the start and end of that hour. So let the interval $(T_0, T_1)$ demarcate the beginning and end of the hour. Also let $x_1, x_2, \ldots, x_n$ be the values of the n samples of the variable $x(t)$ taken at times $t_0 < t_1 \ldots < t_n$ that cover the hour. I.e., $$t_0 < T_0 \leq t_1$$

$$t_{n-1} < T_1 \leq t_n$$

For all t such that $t_0 < t \leq t_n$ $$x(t) = x_i, \text{ if } t_{i-1} < t \leq t_i$$

Then the system computes the following variables for the hour:

$$X_1 = \int_{T_0}^{T_1} x(t)\,dt$$

$$= x_1(t_1 - T_0) + \sum_{i=2}^{n-1} x_i(t_i - t_{i-1}) + x_n(T_1 - t_{n-1})$$

$$X_2 = \int_{T_0}^{T_1} x^2(t)\,dt$$

$$= x_1^2(t_1 - T_0) + \sum_{i=2}^{n-1} x_i^2(t_i - t_{i-1}) + x_n^2(T_1 - t_{n-1})$$

$$\Delta T = (T_1 - T_0)$$

This computation for each hour is done by a background process that computes and stores $X_1$, $X_2$, $\Delta T$ and $T_1$ to represent the statistics of the variable.

From these records, the mean and standard deviation of $x(t)$ for that hour are then computed as follows:

$$\bar{x} = X_1 / \Delta T$$

$$\overline{x^2} = X_2 / \Delta T$$

$$\sigma_x = \sqrt{(\overline{x^2}) - (\bar{x})^2}$$

For Deviation from Normal using Deviation from Mean, the normal range is computed based on the mean and standard deviation of the random variable $x(t)$ for the k week baseline period for an hour. The baseline period consists of same hour of the day for the same day of the week for the previous k weeks. For example, a 6-week baseline for the hour from 1500 to 1600 on Wednesday, June 14, consists of 6 hours, all from 1500 to 1600 hours on Wednesday, June 7, Wednesday, May 31, May 24, May 17, May 10, and May 3.

The mean and standard deviation for the k-week baseline are easily computed given the stored hour records as follows:

$$\bar{x} = \sum_{j=1}^{k} X_{j1}/\Delta T_j$$

$$\overline{x^2} = \sum_{j=1}^{k} X_{j2}/\Delta T_j$$

$$\sigma_x = \sqrt{(\overline{x^2}) - (\bar{x})^2}$$

Where j=1 . . . k is the record index for the previous k weeks, i.e., record j represents the same hour of the same day of the week from j weeks ago. The records contain the values $X_{j1}$, $X_{j2}$, $\Delta T_j$, and $T_j$.

While each record is computed once by the background process, it is used k times in the following weeks. Note also that the record for the hour consists of just 4 variables, rather than a record per sample (a typical number of sample records in an hour is 12). Hence, a significant reduction in processing power and storage is achieved.

Statistics Updating and Retrieval

There are a number of considerations regarding how often the statistics are updated, and how the statistics are retrieved. For one thing, the statistics need to be updated frequently enough so that the relevant rules can adapt to the behavior of the variables and detect changes in those variables promptly. In addition, since the number of statistical results stored in the database module 120 is quite large, it is also important to retrieve them from the data storage efficiently.

Hourly Updating

According to one approach, baseline calculation unit 121 computes the hourly statistics for a variable. If the element associated with the variable is polled every 5 minutes, then there will be 12 samples for every hour. These 12 samples are sent to baseline calculation unit 121 for computing statistics and the results of those computations are stored in data storage unit 121.

When an element transitions into a new hour, LE Engine 100 queries database module 120 for the statistics for the variables associated with that element that are uses in a time over dynamic threshold rule. Depending on the type of the dynamic rule, the retrieval scheme differs as described in the following paragraphs.

Entire Multi-week Range

The retrieval scheme differs depending on whether the rule is based on an entire multi-week range or the rule is based on a specific hour of the day, and a specific day of the week (e.g. Tuesday at 9 pm) over a multi-week range. With respect to the rule based on an entire multi-week range, LE Engine 100 initially queries the database module 120 over the entire multi-week range. That is, LE Engine 100 keeps N intermediate statistics for a variable, where "N" is the number of weeks in the entire multi-week range. As the element crosses into the next hour, data collected in the past hour is incorporated to the statistics while data from the hour in the beginning of the range is removed. Therefore, in a steady state, the database module 120 executes two queries for each hour crossed. One query is to add the new statistics for the hour just passed, the other query is to remove the old statistics for the hour at the beginning of the time range.

Time of Day and Day of Week

With respect to the rule based on a specific hour of the day and a specific day of the week over a multi-week range, the number of data transfers required is equal to the number of weeks in the multi-week range. When an element crosses into a new hour, LE Engine 100 sends N queries to database module 120 for the statistics of the data collected in the hour and day corresponding to the new hour, where "N" represents the number of weeks in the multi-week range. Therefore, in a steady state, N queries are generated each hour, each of the queries corresponding to statistics computed from the 12 data samples collected in a specific hour of the day and a specific day of a week in the multi-week range.

Nightly Updating

An alternative for updating the statistics throughout the day is for baseline calculation unit 122 to do all the required computations at the end of a day. In that case, baseline calculation unit 122 receives a job batch at night, processes all of the data contained in the job, and returns the results to data storage unit 121 afterwards. Then LE Engine 100 retrieves the calculation results when new statistics are needed. This alternative is especially suitable for the rule based on a specific hour of the day and a specific day of the week over a multi-week range, because new statistics are not needed until that hour and day arrives in the next week. This alternative also works for the rule based on an entire multi-week range with a modification that the update frequency being daily, instead of hourly.

Statistics Storage

The time over dynamic threshold rule requires that the moments be computed and stored for every variable associated with the rule. After baseline calculation unit 122 computes the moments for every hour, it stores those statistics in data storage unit 121 using a row for every variable of every element being monitored. If there are multiple requests for monitoring the same variable of an element, only one row is generated for every hour. Therefore, the storage scheme is efficient in that it avoids duplications.

The Output—The Event Viewer

The output of LE Engine 100 is displayed in a Java-based GUI browser, the Exception Event Viewer. From the event viewer, a user in NOC 135 is able to choose to view an exceptions chart and exception counts for any group or group list, monitor the severity of the exceptions, and examine how the exceptions develop in time.

Referring to FIG. 6, an exception event viewer 130 displays an exception event chart 61, an exception event table 62 and an organization frame 63 for communicating information to the network manager. Through exception chart 61, the system shows the total number of active exceptions for all elements in a selected group, or by default displays all the elements exception count. Through exception event table 62, the system lists all current exceptions. And through organization frame 63, the system allows a user to view all group lists, groups and elements and give an overall summary data view. Each of the display components can be easily resized, collapsed or expanded so that a user can focus on a particular display component.

Exception Event Chart

Through exception event chart 61, a user can view historical exception events and current exceptions events at the same time. LiveExceptions uses event chart 61 to display the total exception counts on the vertical axis for each polling period versus time, which is displayed as polling intervals on the horizontal axis in a scrollable panel. If a user has not selected a group or a group list from organization frame 63, event chart 61 displays all the groups total exception count as a default. If the user selects a group or a group list from organization frame 63, it will display all the current active exceptions for the selected group or group list. Also event chart 61 displays the name of the group selected, otherwise a default name "All" is shown. An exception chart viewing window range is configurable with the granularity of per polling period.

Exception Event Table

Exception event table 62 presents information in columns and rows. The columns have the following headers: Group list name, group name, element name, type of alert, start time of alert, end time of alert, severity of alert, technology type and key variables that triggered exception for this element from the list. Event table allows a user to select a column header to sort the element list in a scrollable panel. The user has the flexibility in arranging the orders of table columns via selecting the header and dragging and dropping to a user preferred column position, as well as configuring the columns to be viewed or hidden by using the right mouse button menu select options. The cleared, i.e. inactive, exceptions in the event table will be aged out from the event table, if they stayed inactive for a period time longer than a configured valued. Also, if a user switches from one group or group list selection to another, any aged inactive exceptions are removed from the event table.

Organization Frame

Organization frame 63 provides mechanism by which a user can quickly see where the exceptions occur and can to drilldown to the exceptions to access further information that is collected by the system. In organization frame 63 each group has a total number of exceptions occurring in that group. The exception event group list frame gives organization view of all the groups and allows a user to expand the group list and to groups and to elements, or to collapse a group of elements into a group and a group list in a scrollable frame. If a user selects a group from organization frame 63, event chart 61 displays the current exception counts in the event chart and the event table displays the appropriate data attributes. The groups or group lists are accessible only to the users who are associated with the groups and group lists.

Top 10 Exceptions Window

The Java-based event viewer 130 allows a user to click from an icon to popup a separate dialog window to display the top 10 exceptions with group or group list names and the total exception counts for each group or group list. The display of top 10 exceptions is automatically updated for a configured time period, and the last update time is also displayed. This popup dialog window allows to drilldown to another event viewer by clicking on the group or group list name.

Popup Menu Options

In addition, Java-based event viewer 130 allows a user to click on the right mouse button from organization frame 63 to launch a new event viewer such that the user can display and examine another set of elements or groups at the same time.

Alarm Detail Report

LiveExceptions can generate for the user an historical report of alarms or exceptions and display that report in event viewer 130. LiveExceptions enables the user to generate an alarm detail report, and then select an alarm or an exception for which the report is to be generated. The displayed trend report is a two-dimensional chart, the x-axis indicating the time, and the y-axis indicating the value of the monitored variable.

Figure 7:
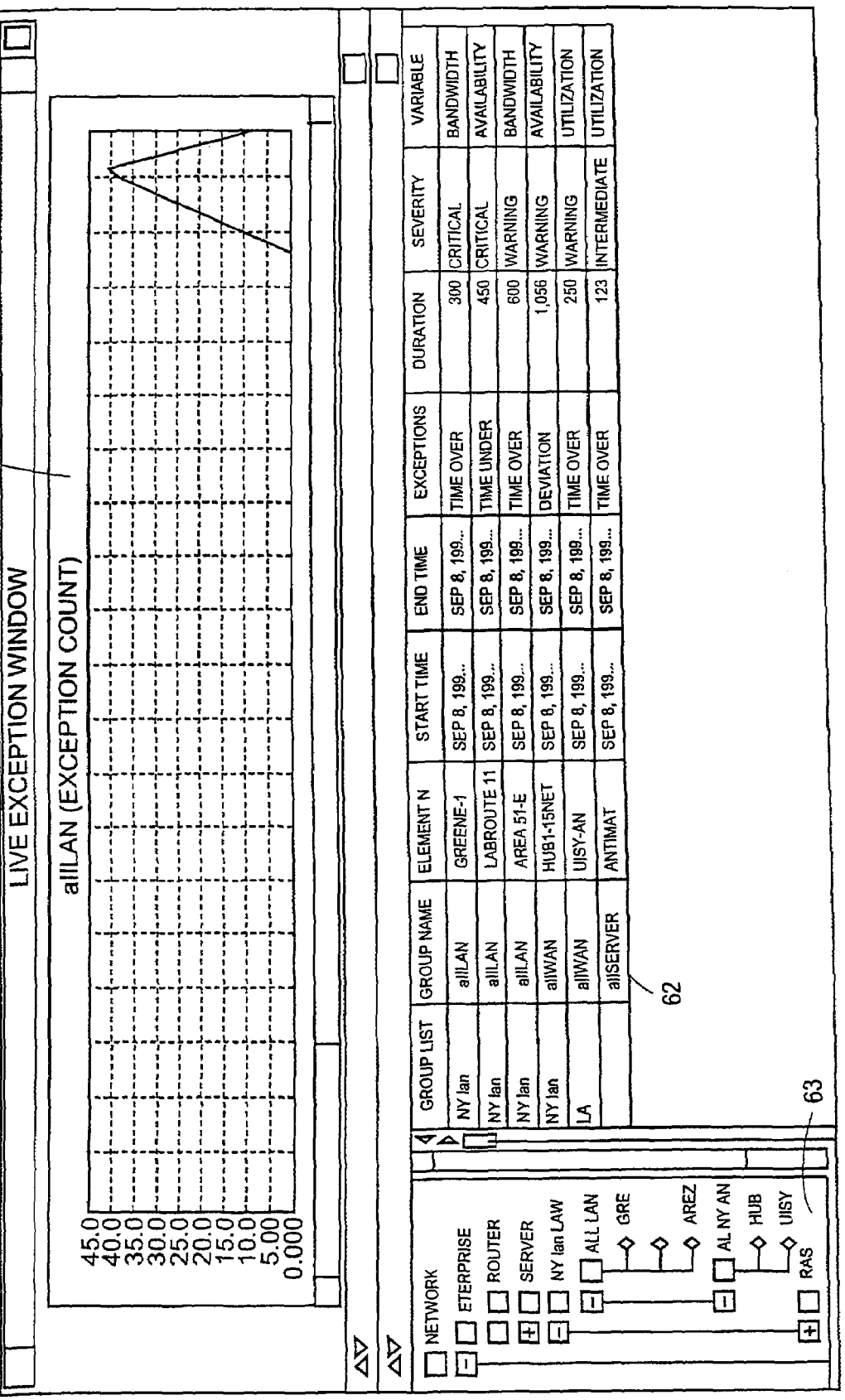
FIG. 7 is an example of a browser screen for displaying the network performance information to the user.
Figure 8:
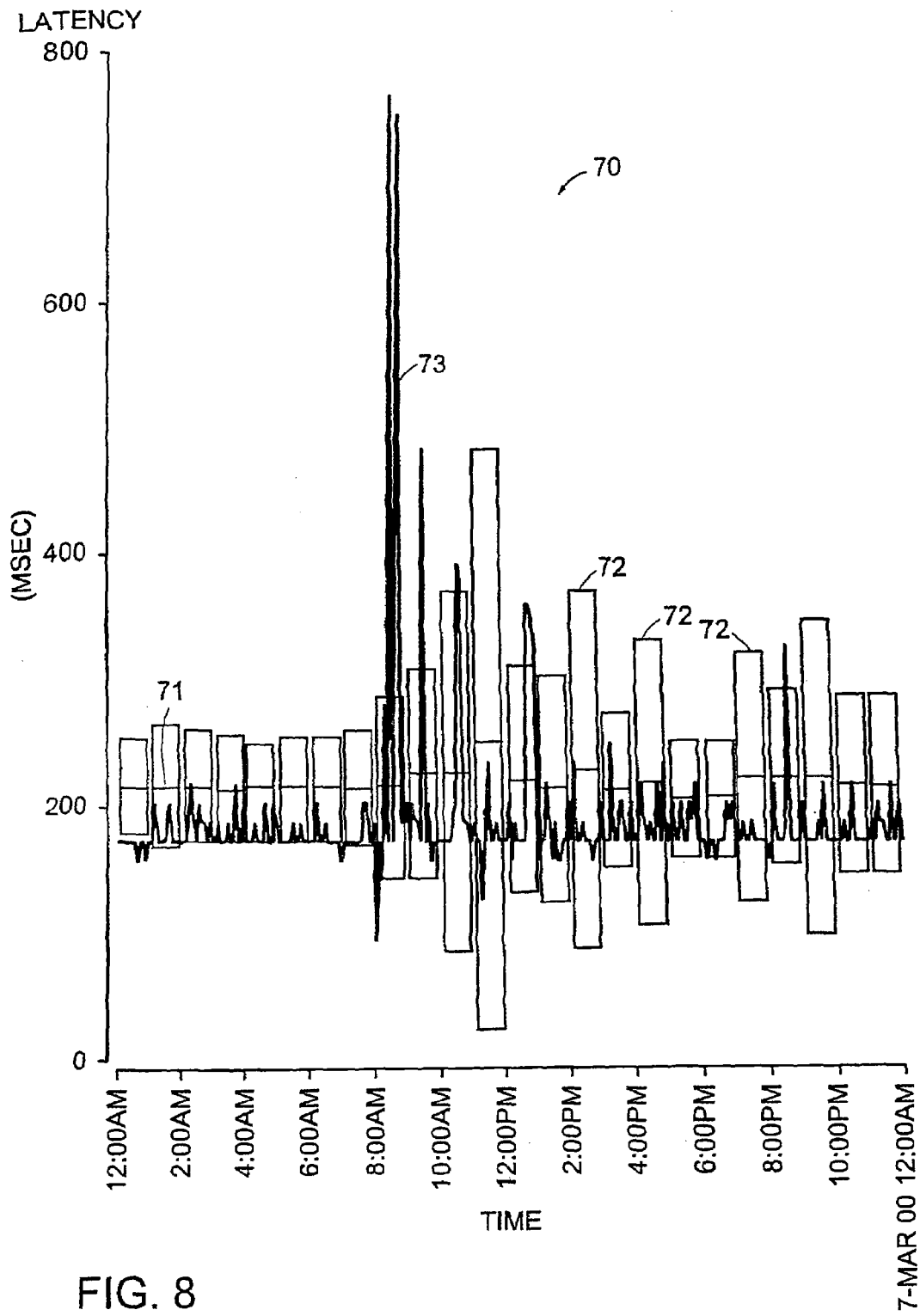
FIG. 8 is an example of an alarm detail report.

An example of an alarm detail report 70 for a particular variable is shown in FIG. 7. Report 70 plots the value of the relevant variable as a function of time (see plot 73). It also displays a sequence of vertical bars 72, each one representing a different 1-hour period of time and each one having a center line 71 marking the mean value of that variable for that time of day over a preceding period of time. The extent of each bar characterizes the observed variation of that variable from its mean over that preceding period of time. In this case, it represents plus and minus one standard deviation from the observed mean value.

In the illustrated example, the rule that is being applied is a time over dynamic threshold rule. More specifically, it is an alarm detail report for the latency associated with a WAN element and it uses the time over dynamic threshold rule. It indicates the measure of latency of the element with respect to time. The varying level of center lines 71 from bar to bar indicates that the rule updates its threshold based on mean value calculations and the varying lengths of the bars indicates that the rule is also updating its normal range base on the standard deviation calculations. When line 73 crosses either the upper or lower edges of a bar element 72, for its period of time, LE Engine 100 accumulates the time during which it is outside of the bar and triggers an alarm if the total accumulated time in the analysis window exceeds the condition window as specified in the rule. With report 70, a user is able to view the historical trend of a variable.

If the rule had been a time over a fixed threshold, the center lines of the bars would all have been at the same level and would not have reflected the observed variation in that variable over some preceding period of time.

Reconfiguration

System 10 allows a user to customize the configuration of LE Engine 100 based on how he desires to manage the network. Configuration changes generally include alarm rule additions/deletions, element additions/deletions/modifications, profile additions/deletions/modifications, group or group list additions/deletions/modification, and association additions/deletions, where the association defines a mapping between a profile and a group or a group list.

Reconfiguration Process Flow

In general, the basic flow for reconfiguration includes the following steps:
1. A user makes some changes in the user interface, or the user imports a file containing the configuration changes.
2. Messages describing the changes are broadcast.
3. LE Engine 100 receives messages indicating changes occurred
4. LE Engine 100 updates the state of its internal data structures to reflect the change.

With this process, changes are implemented in LE Engine 100 and related modules are notified. There is no need for re-stalling the Engine or re-compiling any files.

One approach to reconfiguration is to make all the necessary updates upon the time LE Engine 100 receiving a reconfiguration message, so that all the changes happen at the same time. However, some times this approach has a poor performance due to inefficiency. An alternative is an amortized approach that allows changes to take place at poll time.

EXAMPLE

Standard Approach for Alarm Rule Changes

When a user updates an alarm rule in a profile, all elements currently using the profile containing the rule need to be made aware of that change. With the first approach mentioned above, LE Engine 100 needs to update the profile associated with the rule, identify a group or a group list associated with the profile, and find all the elements using the profile in the group or group list. At this time, all the elements relating to the rule are notified that a change in the alarm rule has occurred. With this approach, it is necessary to examine every association between a profile and a group or a group list, and every group or group list to identify the one associated with the profile, and every element in the system. As a result, this approach is quite inefficient.

EXAMPLE

Amortized Approach for Alarm Rule Changes

With the amortized approach, only the profile containing the alarm rule is updated at reconfiguration time. Updating each element is left until poll time. This allows reconfiguration to be much simpler, and updating can be done in effectively constant time, at the expense of an overhead at poll time. More specifically, every time an element is polled, it has to check all the profiles it is associated with to determine if any of the profiles has been updated due to the alarm rule change.

System Hardware

Figure 9:
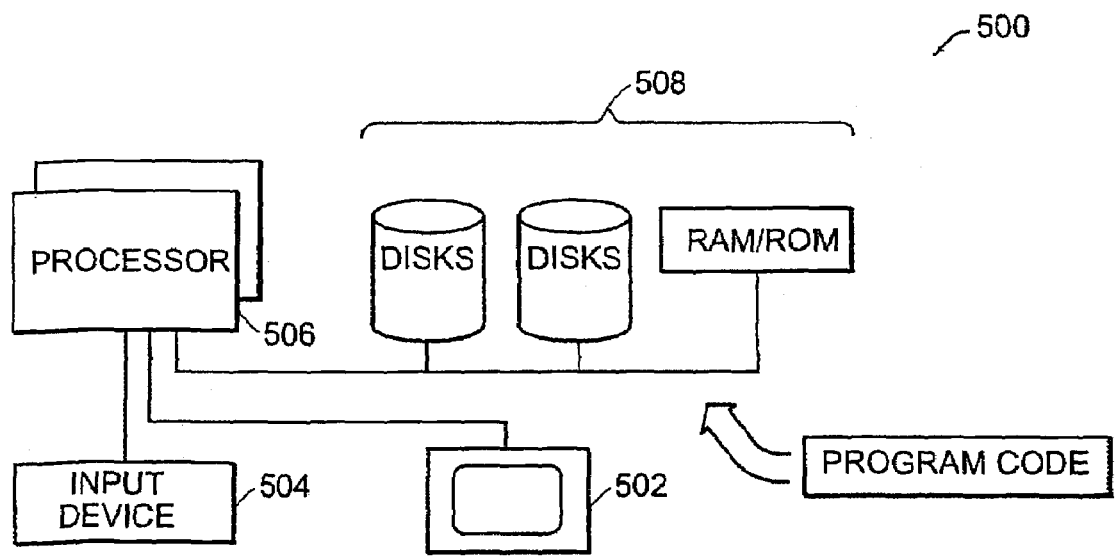
FIG. 9 shows a computer system on which the LiveExceptions can be implemented.

FIG. 9 shows a computer system 500 including a workstation display unit 502, an input device (e.g. keyboard) 504, one or more processors 506, and a computer readable medium 508 having a plurality of instructions (e.g. program code) 510 stored thereon. When executed by processors 506, instructions 510 cause processors 506 to implement the above-described functionality of the LiveExceptions system, including the poller module, the configuration module, the LE Engine, the web server and the baseline calculation unit. In addition to storing the program code, the computer readable medium, which might typically be implemented by a combination of disk storage, RAM, and ROM, also implements the data storage that is required in the system.

A number of embodiments of the invention have been described. Nevertheless, it will be understood that various modifications may be made without departing from the spirit and scope of the invention. Accordingly, other embodiments are within the scope of the following claims.

What is claimed is:

1. A method of displaying on a computer display screen historical performance of an element on a network, said method comprising:
   monitoring performance of the element;
   for each of a plurality of time slots that recur periodically over a plurality of cycles, deriving a measure of performance for the element from its monitored performance, wherein the plurality of time slots include a first time slot that recurs each cycle and a second time slot separate from the first time slot that recurs each cycle;
   for each of the plurality of time slots, computing an average value for the measure of performance of the element over corresponding time slots such that a first average value for the measure of performance of the element is computed for the first time slot over a plurality of cycles and a second average value for the measure of performance of the element is computed for the second time slot over a plurality of cycles;
   for each of the plurality of time slots, computing a measure variability for the measure of performance during the most recent occurrence of the time slots in comparison to the average value over corresponding time slots such that a first measure variability is computed from a derived measure of performance during a most recent occurrence of the first time slot and the first average value, and such that a second measure variability is computed from a derived measure of performance during a most recent occurrence of the second time slot and the second average value; and
   on the computer display screen: (1) displaying a first indicator of the computed average value over time slots corresponding to that time slot such that the first indicator is displayed for each of the first time slot and the second time slot and indicates the first average value and the second average value, respectively; (2) displaying a second indicator of the measure variability for the time slots such that the second indicator is displayed for each of the first time slot and the second time slot and indicates the first measure variability and the second measure variability, respectively; and (3) displaying a third indicator of the derived measure of performance for the individual time slots such that the derived measure of performance for the most recent occurrence of the first time slot is displayed and the derived measure of performance for the most recent occurrence of the second time slot is displayed.

2. The method of claim 1, wherein the displaying operation comprises:
   (1) displaying the first indicators for the plurality of time slots concomitantly on the computer display screen;
   (2) displaying the second indicators for plurality of time slots concomitantly on the computer display screen; and
   (3) displaying the third indicators for the plurality of time slots concomitantly on the computer display screen.

3. The method of claim 1, wherein the displaying operation comprises displaying concomitantly on the computer display screen, for individual time slots in the plurality of time slots, (1) the first indicator, (2) the second indicator, and (3) the third indicator.

4. The method of claim 1, wherein the displaying operation comprises displaying concomitantly on the computer display screen for all of the time slots in the plurality of time slots, (1) the first indicator, (2) the second indicator, and (3) the third indicator.

5. The method of claim 1, wherein individual time slots in the plurality of time slots correspond to different times of day, and wherein the average value for the measure of performance of the element for a given time slot from the plurality of time slots is computed from values for the measure of performance of the element taken at the same time of day as the given time slot, but on different days than the given time slot.

6. The method of claim 1, wherein the measure of performance is an amount of time that a variable spent above a threshold value.

7. The method of claim 6, wherein the variable is a Management Information Base variable.

8. A non-transient computer-readable medium storing a computer program for displaying on a computer display screen historical performance of an element on a network, said program being configured to cause a computer system to perform the functions of:
   monitoring performance of the element;
   for each of a plurality of time slots that recur periodically over a plurality of cycles, deriving a measure of performance for the element from its monitored performance, wherein the plurality of time slots include a first time slot that recurs each cycle and a second time slot separate from the first time slot that recurs each cycle;
   for each of the plurality of time slots, computing an average value for the measure of performance of the element over corresponding time slots such that a first average value for the measure of performance of the element is computed for the first time slot over a plurality of cycles and a second average value for the measure of performance of the element is computed for the second time slot over a plurality of cycles;

for each of the plurality of time slots, computing a measure variability for the measure of performance during the most recent occurrence of the time slots in comparison to the average value over corresponding time slots such that a first measure variability is computed from a derived measure of performance during a most recent occurrence of the first time slot and the first average value, and such that a second measure variability is computed from a derived measure of performance during a most recent occurrence of the second time slot and the second average value; and on the computer display screen: (1) displaying a first indicator of the computed average value over time slots corresponding to that time slot such that the first indicator is displayed for each of the first time slot and the second time slot and indicates the first average value and the second average value, respectively; (2) displaying a second indicator of the measure variability for the time slots such that the second indicator is displayed for each of the first time slot and the second time slot and indicates the first measure variability and the second measure variability, respectively; and (3) displaying a third indicator of the derived measure of performance for the individual time slots such that the derived measure of performance for the most recent occurrence of the first time slot is displayed and the derived measure of performance for the most recent occurrence of the second time slot is displayed.

9. The computer-readable medium of claim 8, wherein the displaying operation comprises:

(1) displaying the first indicators for the plurality of time slots concomitantly on the computer display screen;

(2) displaying the second indicators for plurality of time slots concomitantly on the computer display screen; and (3) displaying the third indicators for the plurality of time slots concomitantly on the computer display screen.

10. The computer-readable medium of claim 8, wherein the displaying operation comprises displaying concomitantly on the computer display screen, for individual time slots in the plurality of time slots, (1) the first indicator, (2) the second indicator, and (3) the third indicator.

11. The computer-readable medium of claim 8, wherein the displaying operation comprises displaying concomitantly on the computer display screen for all of the time slots in the plurality of time slots, (1) the first indicator, (2) the second indicator, and (3) the third indicator.

12. The computer-readable medium of claim 8, wherein individual time slots in the plurality of time slots correspond to different times of day, and wherein the average value for the measure of performance of the element for a given time slot from the plurality of time slots is computed from values for the measure of performance of the element taken at the same time of day as the given time slot, but on different days than the given time slot.

13. The computer-readable medium of claim 8, wherein the measure of performance is an amount of time that a variable spent above a threshold value.

14. The computer-readable medium of claim 13, wherein the variable is a Management Information Base variable.

* * * * *

UNITED STATES PATENT AND TRADEMARK OFFICE
CERTIFICATE OF CORRECTION

| | | |
|---|---|---|
| PATENT NO. | : 7,877,472 B2 | |
| APPLICATION NO. | : 12/367860 | |
| DATED | : January 25, 2011 | |
| INVENTOR(S) | : Mark W. Sylor et al. | |

It is certified that error appears in the above-identified patent and that said Letters Patent is hereby corrected as shown below:

On the title page, insert Item (63):

-- (63) Continuation of application No. 09/886,611, filed on Jun. 21, 2001, now Pat. No. 7,490,145.--

On the title page, insert Item (60):

--(60) Provisional application No. 60/213,211, filed on Jun. 21, 2000.--

Signed and Sealed this
Twenty-second Day of March, 2011

David J. Kappos
*Director of the United States Patent and Trademark Office*